July 12, 1932.    E. A. SPERRY    1,867,334
AUTOMATIC STEERING MECHANISM FOR DIRIGIBLE AIRCRAFT
Original Filed July 29, 1924
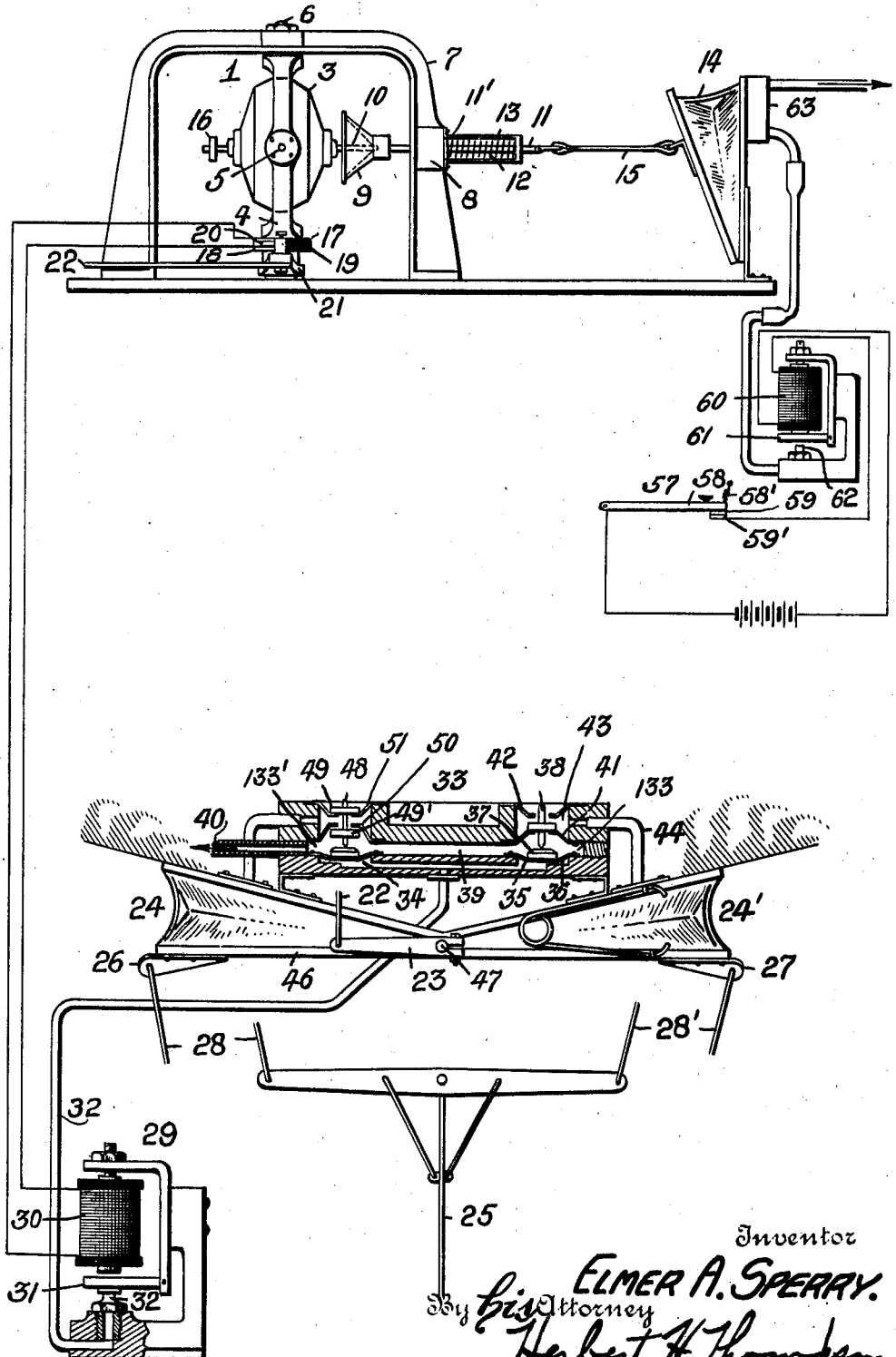
Inventor
*Elmer A. Sperry.*
By his Attorney
*Herbert H. Thompson*

Patented July 12, 1932

1,867,334

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., OF BROOKLYN, NEW YORK, A CORPORATION OF NEW YORK

AUTOMATIC STEERING MECHANISM FOR DIRIGIBLE AIRCRAFT

Original application filed July 29, 1924, Serial No. 728,812. Divided and this application filed March 27, 1925, Serial No. 18,673. Renewed October 20, 1931.

This invention relates to automatic control of dirigible objects or vehicles and has particular reference to the improvement and simplification of the means for steering an object, such as an airplane, in azimuth, which is disclosed in the specification and drawings of my prior patents and also the patent to Lawrence B. Sperry No. 1,757,096 dated May 6, 1930 for Gyroscopic pilot for airplanes. The chief object of the present invention is to simplify and improve the prior systems by eliminating all elements which are not absolutely essential to operation thus enhancing its reliability.

In the present invention, as in that disclosed in the above mentioned prior patents, use is made of a gyroscope for normally controlling the movements of a body in azimuth.

According to the present invention, I eliminate much of the complication of the prior systems of automatic control by reducing the function of the part or parts controlled at will to a minimum and employing the gyroscope for governing the airplane in one direction in azimuth.

Referring to the drawing which I now consider discloses the preferred form of my invention, the single figure discloses a diagrammatic view of the elements of my invention as applied to the steering of an aircraft.

As well known in the art, the normal operation of the airplane is controlled from one or more gyroscopes, known respectively as the azimuth gyroscope 1 and the stabilizing gyroscope, the function of the former being to steer or stabilize the craft in azimuth by controlling the ordinary rudder, and the function of the latter being to maintain the lateral and longitudinal stability of the craft and to maintain the flight at uniform height above the earth. As this application is limited to the azimuth control, the last named gyroscope and the control therefrom is not shown or claimed herein. The azimuth gyroscope 1 (which may be referred to as a stabilizing device in that it maintains the steering of the aircraft stable) is shown as comprising a casing 3, in which, it will be understood, a rotor driven by any suitable means, such as electricity or air jets, is journaled for spinning about a normally horizontal axis. Said casing is substantially balanced (except as hereinafter noted) about a horizontal axis at right angles to the spinning axis in a vertical ring 4 on pivots 5. The ring 4 in turn is journaled for turning about a vertical axis 6 in frame 7. The gyro casing, therefore, in effect, constitutes an inner gimbal ring.

The gyroscope illustrated is of the electrically spun type. As a means for locking or caging the gyroscope, I have shown a bell mouthed member 9 which, when pushed to the left, engages a pin 10 extending from the gyro case (or inner ring) and centralizes or locks the gyroscope against precession.

Member 9 is shown provided with a rearwardly extending stem 11 passing through one of hollow cylindrical extensions 8 of member 7. The stem 11 is provided adjacent its outer end with an extension 11', thereby creating a shoulder for the engagement of a coil spring 12. At its outer end, said spring engages a bracket 13 secured to part 8. The spring operates to normally push the caging member 9 inwardly, but this action is opposed by means of servo motor 14 linked to the stem by link 15. Said motor is shown in the form of a bellows which, after the airplane has started, is normally maintained in the collapsed condition so that the gyro is uncaged.

Preferably the gyro is provided with a small adjustable weight 16 for either balancing the gyroscope so that it remains fixed in azimuth, or preferably for causing it to have a predetermined rate of turn in azimuth for a purpose hereinafter described.

For controlling the plane from the gyroscope I provide a contact sector 17 secured to the vertical ring 4 of the gyroscope. As shown, said sector is provided with a single live section 18 and a dead or insulated section 19. The trolley or brush 20, cooperating therewith is preferably mounted on a pivoted arm 21, in order that a follow-up factor from the rudder may be introduced. As shown, said arm is connected by link 22 to an arm 23 movable with the main bellows 24, 24' which control the rudder or steering means 25. For this purpose the bellows are shown provided with ears 26 and 27 to which the rudder wires 28, 28' are connected. The bellows are controlled from the trolley through a relay 29. Said relay may comprise an electromagnet 30 which, when excited attracts pivoted armature 31. Said armature normally closes the end of a pipe or valve 32, said pipe being connected to an operating valve 33. Said valve is made in two parts, which may be termed inside (133) and outside (133') valves respectively. Valve 133 comprises a lower chamber 34 which is common to both, on the top of one end of which is a flexible diaphragm 35 having a small hole or bleeder valve 36 therethrough. On said diaphragm rests the valve stem 37 which carries the double acting valve disc 38. The main chamber 39 which is also common to both valves is connected to pipe 40 which leads to a differential source of air pressure, either positive or negative as preferred. In the system shown a negative pressure or vacuum system is employed so that air is normally being drawn out of the pipe 40. The lower valve seat 41 of the "inside" valve 38 communicates with the chamber 39, while the upper valve seat 42 communicates with the atmosphere. The chamber 43 surrounding the valve disc leads through pipe 44 to the bellows 24'. It will be readily apparent, therefore, that as long as the magnet 30 is unexcited and the end of pipe 32 closed, that the pressure on the two sides of the diaphragm 35 will be approximately equal due to bleeder hole 36. In this condition the valve 38 rests against seat 41 so that the bellows 24' is expanded under the action of the oppositely acting bellows 24 connected to the common plate 46 pivoted on shaft 47. If, however, the end of pipe 32 is suddenly opened to the atmosphere, the pressure in chamber 34 will become greater than that in chamber 39 and valve 38 will be lifted on to seat 42. This, it will be seen, will close pipe 44 to the atmosphere and open it to the source of negative pressure thus collapsing the bellows.

The other half of the bellows 24 is operated by a reverse-acting or "outside" relay valve 133', since this bellows should be expanded when bellows 24 is collapsed and vice versa. In this case the valve stem 48 carries two spaced valves 49 and 49' which alternatively engage upper and lower valve seats 50 and 51 when relay valve 31 is closed or opened, this being the opposite of valve 38. In other words, bellows 24' is collapsed and bellows 24 expanded when valve 31 is closed and bellows 24' is expanded and 29 collapsed when valve 31 is opened. In operation a balance is maintained between the bellows by a hunting action of the trolley and contact.

For altering the course in azimuth, I provide means controllable at will for operating the bellows 14 hereinbefore described so that the gyro may be caged at the will of the operator.

For this purpose there is provided a switch 58 to close contacts 59, 59' in circuit with relay magnet 60 which controls the bellows 14. Said contacts may be operated either directly or indirectly by the operator. Said relay 60 operates on a similar principle to the relay 30, previously described, in causing the expansion and collapse of the bellows 14 by the opening and closing through armature 61 of the end of pipe 62. This operates the bellows 14 through an outside valve mechanism 63 similar to valve 49. Bellows 14 is, therefore, normally collapsed.

The steering in azimuth of the plane is accomplished substantially as follows:

If it is desired to govern the course at will after launching, I prefer to adjust the weight 16 so that the gyro will precess slowly in one direction or the other, thus causing the plane to turn slowly in azimuth. When the operator sees that the plane is turning off its course, or is not following the desired course, he closes contacts 59, 59'. This, as explained above, causes the expansion of the bellows 14 and the consequent caging of the gyroscope through the advancement of the hollow cone 9, thus locking the gyroscope and preventing its precession. The parts are so arranged that when the gyro is caged, the rudder will be rotated to a position to turn the craft in the opposite direction from that in which it is caused to turn by the precession of the gyro due to weight 16. When the operator sees that the plane has turned back to or a little beyond its course, he releases the key thus uncaging the gyro and permitting the cycle to be repeated. It is obvious that by proper manipulation of the contacts 59, 59', the course may be changed at will to any desired course by either permitting the precession of the gyro due to weight 16 to turn the craft to a new course or effecting the change through caging the gyro as explained, or as outlined in said prior Patent No. 1,757,096 to Lawrence B. Sperry.

In accordance with the provisions of the patent statutes, I have herein described the principle and operation of my invention, together with the apparatus which I now consider to represent the best embodiment thereof, but I desire to have it understood that the apparatus shown is only illustrative and that the invenion can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. In a control system for dirigible bodies, the combination of a movable body, steering means therefor, a stabilizing device, means including a vacuum system controlled by said stabilizing device for operating said steering means, and means controlled by said vacuum system for rendering said stabilizing device inactive.

2. The combination with a body rotatable about a given axis, of means for automatically rotating said body about said axis, including a vacuum mechanism and means for admitting air under atmospheric pressure to said vacuum mechanism, including means for disabling said automatic rotating means.

3. The combination with a gyroscope having a gimbal ring or casing provided with an extension, of a member having diverging walls movable into and out of engagement with said extension through a predetermined path for controlling the operation of said gyroscope, and a vacuum system arranged to move said member into and out of engagement with said gyroscope.

4. The combination with a vacuum device, of stabilizing means arranged to control the admission of fluid into said vacuum device, and means controlled by said vacuum device for restoring said stabilizing means to a predetermined position.

5. An automatic pilot for aircraft comprising a steering gyroscope mounted for freedom about its vertical axis, means for automatically steering the craft from said gyroscope, means for exerting a torque thereon to cause slow precession thereof about said vertical axis whereby said craft is turned in azimuth in one direction, and means for locking the gyroscope at will in such position with respect to the craft that said steering means turns the craft in the other direction.

6. An automatic pilot for aircraft comprising a steering gyroscope mounted for freedom about its vertical axis, means for automatically steering the craft from said gyroscope, and means for exerting a torque thereon to cause precession thereof about said vertical axis whereby said craft is turned in azimuth.

7. An automatic pilot for aircraft comprising a steering gyroscope mounted for freedom about its vertical axis, means for exerting a torque thereon to cause precession thereof about said vertical axis whereby said craft is turned in azimuth in one direction, and means for causing turning of the craft in the other direction through said gyroscope.

8. A self-steering, self-stabilizing airplane in which the course is governed by alternately caging and releasing the course maintaining means.

9. The method of steering dirigible craft from a gyroscope mounted with three degrees of freedom which consists in exerting on the gyroscope a torque about its horizontal axis to cause slow precession thereof about a vertical axis.

10. An automatic pilot for aircraft comprising a steering gyroscope mounted for freedom about its vertical axis, means for automatically steering the craft from said gyroscope, means for exerting a torque thereon to cause precession thereof about said vertical axis whereby said craft is turned in azimuth, and means operable at will for rendering said torque means inoperative to precess the gyroscope.

11. A gyroscopic control system for dirigible aircraft having a rudder, comprising a gyroscope, a gimbal mounting therefor mounting said rotor for spinning about one horizontal axis, for oscillation about a horizontal axis at right angles thereto and for freedom about a vertical axis, a servo-motor controlled from said gyroscope for actuating said rudder, and means for causing turning of said craft including a torque appying member connected to said gyroscope to exert a torque about said second-mentioned horizontal axis.

In testimony whereof I have affixed my signature.

ELMER A. SPERRY.